United States Patent [19]

Knavish et al.

[11] 4,001,001
[45] Jan. 4, 1977

[54] HORIZONTAL GLASSMAKING FURNACE

[75] Inventors: Leonard A. Knavish, Plum Borough; Richard L. Cerutti, Seminole, both of Pa.

[73] Assignee: PPG Industries, Inc., Pittsburgh, Pa.

[22] Filed: Jan. 19, 1976

[21] Appl. No.: 650,387

[52] U.S. Cl. .................................. 65/337; 65/136; 65/345; 65/347

[51] Int. Cl.² .......................................... C03B 5/02

[58] Field of Search ............ 65/134, 135, 136, 337, 65/345, 347, 335

[56] References Cited

UNITED STATES PATENTS 3,574,585    3/1976    Robertson et al. ................... 65/135

FOREIGN PATENTS OR APPLICATIONS 366,530    2/1932    United Kingdom ................. 65/335

Primary Examiner—Arthur D. Kellogg
Attorney, Agent, or Firm—E. Kears Pollock

[57] ABSTRACT

A horizontal glassmaking furnace adapted for melting glass batch materials by the application of heat to them from overhead flames within the furnace is provided with submerged electric heating electrodes in a region adjacent to where glass batch materials are charged to the furnace and, while overhead flames are reduced or eliminated above the glass batch materials in the vicinity of the electrodes, the glass batch materials are melted from below by action of the electrodes; overhead flames are maintained above exposed molten glass where the glass batch materials have already melted. Discharge of particulate batch materials from the furnace by action of overhead flames is substantially reduced while the thermal efficiency of the furnace is enhanced.

3 Claims, 3 Drawing Figures

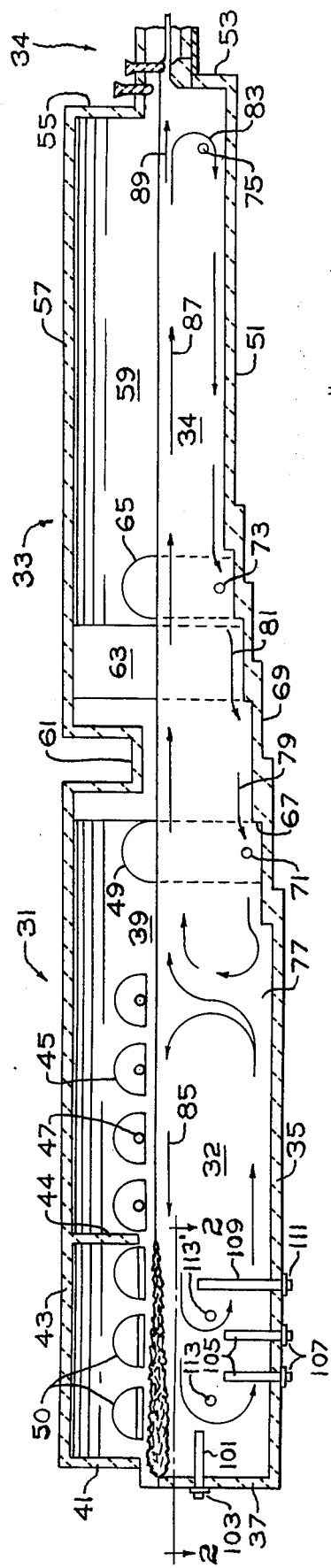
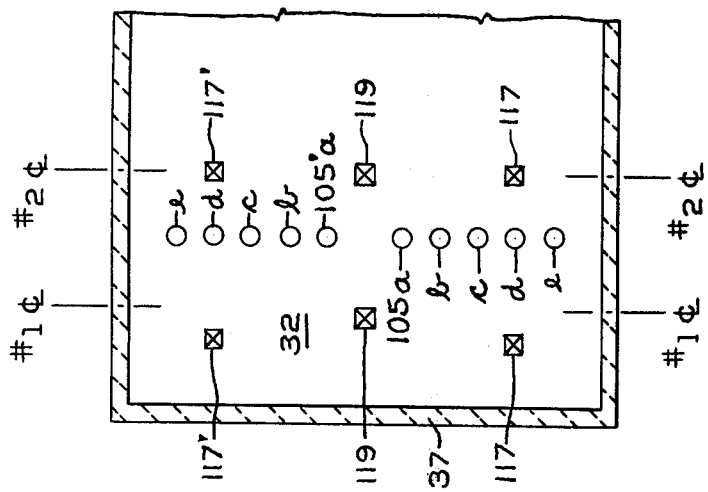
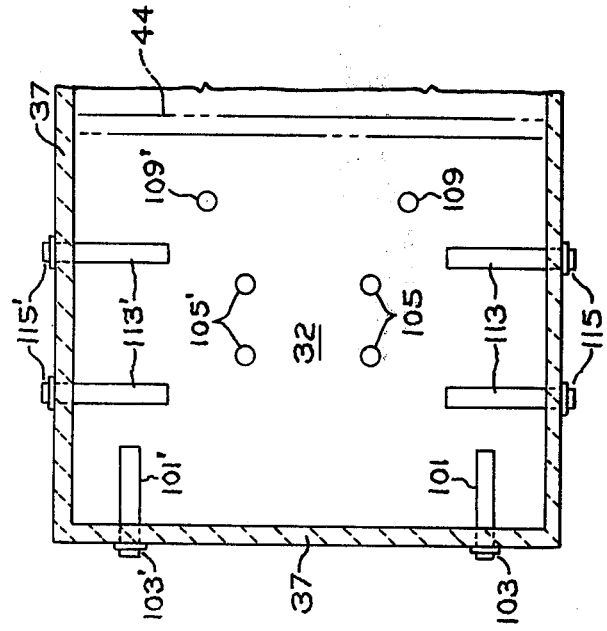

HORIZONTAL GLASSMAKING FURNACE

BACKGROUND OF THE INVENTION

This invention relates to melting and refining glass for the manufacture of glass articles, particularly for the manufacture of flat glass. More particularly, this invention relates to the application of heat to glass batch materials in a glassmaking furnace adapted for heating such materials as they float on and advance along the surface of a pool of molten glass maintained in the furnace.

Glass batch materials have been melted and molten glass refined and conditioned by the application of heat to glass batch and to molten glass from a variety of sources in furnaces of varied design. Today, for the commercial production of glass products on an efficient scale, molten glass is prepared for forming in furnaces of several general kinds. These are fossil-fueled furnaces, such as regenerative furnaces and recuperative furnaces, electric furnaces of the kind illustrated in U.S. Pat. No. 2,225,616 and U.S. Pat. No. 2,225,617. There are fossil fuel-fired furnaces which include electric-boosting electrodes as shown in U.S. Pat. Nos. 2,397,852, 2,600,490, 2,636,914 and 2,780,891. These patents and many other patents and publications illustrate that for many years there has been widespread interest and activity in the use of electricity to melt glass batch and to heat molten glass.

According to the prior art, heating electrodes have been employed in glassmaking furnaces in several different ways. For example, electrodes have been used in batch charging kilns, as in U.S. Pat. No. 2,397,852, and along the walls of furnaces, as in U.S. Pat. No. 2,975,224, to heat naturally cold regions of the furnaces where heat is normally lost to the outside environment. When used near side walls of a horizontal furnace, electrodes have served to establish convective flows in molten glass which keep unmelted batch in the center of the furnace away from its side walls.

In general, when both electricity and fossil fuels have been used to provide heat to the same glassmaking furnace, the fossil fuels have been employed to melt glass batch in the region of the furnace where batch is advancing freely through the furnace from its charging kilns. Electrodes have been positioned in the furnace well downstream from where batch is charged in order to heat molten glass beyond the region of unmelted batch and to strengthen the convective flow, known as the "spring zone" flow, within the molten glass as shown in U.S. Pat. Nos. 2,512,761, 2,636,914 and Canadian Pat. No. 634,629.

Given a comprehensive view of the prior art relating to the use of electric heating electrodes in glassmaking furnaces, it is apparent that it is well known that such devices may be used to advantage. The questions facing an artisan in the glassmaking art are not concerned with whether or not to consider the use of heating electrodes. Rather, the questions are: Where should heating electrodes be placed in a furnace? How should those electrodes be used in combination with the other elements of the furnace to achieve a desired benefit?

The specific problems confronting the present applicants have not been considered in the past as being directly relevant to electric melting and heating glass. In a horizontal glassmaking furnace, whether regenerative or recuperative, there are undesired fuel inefficiencies and there is a problem of unmelted batch being blown from the furnace through checker brick packing to the stack or exhaust system serving the furnace. The first of these problems would invite at least a study of the potential of electric heating, but the applicants have discovered that both problems can be greatly alleviated by a particular application of electric heating to a glassmaking furnace.

SUMMARY OF THE INVENTION

As glass batch materials float on and are advanced along the surface of a pool of molten glass in a horizontal glassmaking furnace, heat is applied to the molten glass beneath the advancing glass batch and the otherwise usual flow of gases (flames) over the advancing unmelted glass batch is kept so insubstantial as to avoid batch pickup and discharge to the environment. The heat, which is applied from below the advancing unmelted batch, results from the application of electric power to submerged electrodes.

Meanwhile, beyond the unmelted glass batch, where the upper surface of the pool of molten glass is exposed, heat is applied from above to the molten glass to provide sufficient heat to assure a spring zone flow remote from the electrodes and thus insure sufficient residence time upsteam of the spring zone to thoroughly homogenize the molten glass. This overhead heat may be provided by electric resistance heaters but is preferably provided by flames from the combustion of gas, oil, powdered coal or other fossil fuels.

The heat, which is supplied to the molten glass beneath the advancing unmelted glass batch, is preferably provided by the action of electrodes extending into the furnace beneath the surface of the pool of molten glass. When a suitable voltage is imposed between electrodes which are spaced from one another, current passes through the molten glass between them and the glass is heated according to the well-known Joule heating effect. The electrodes are spaced a sufficient distance from where the glass batch is charged to the furnace so that it is freely advancing along the surface of the molten glass above the electrodes.

A plurality of undesired small spring zone flows, such as encountered generally with electric melting schemes, are avoided. Also, to the extent that heat is added from below the floating unmelted batch materials, heat input from above may be avoided. As a result, there is established one vigorous spring zone flow which is located a substantial distance downstream from the batch line where melting is completed. It is the overhead heating downstream of the batch line that provides for a continued rise in surface glass temperature beyond the batch line which permits the downstream displacement of the spring zone and the early refining of the molten glass.

This method is particularly applicable to the melting and refining of glass in a horizontal, regenerative-fired, glassmaking furnace. In such a furnace, particularly a typical one having from five to eight side firing ports on each of its elongated sides, a row of electrodes is positioned across the bottom of the furnace between the first and second firing ports downstream from the charging end of the furnace. The first two or three firing ports on each side of the furnace are dampered or completely closed off to slow or stop the flow of gases from the furnace over the unmelted batch and out through those ports to the regenerators.

Optionally, a drop arch or like barrier is extended across the headspace of the furnace above the molten glass and unmelted batch downstream of the last dampered or closed ports to segregate the headspace into two regions: one above unmelted batch and one above the exposed upper surface of the pool of molten glass. Of course, the exact location of the batch line where the batch finally is all melted may vary slightly upstream or slightly downstream from the location of such a barrier without detrimental effect. By placing this barrier in the furnace, the flow of gases over unmelted batch is further reduced so that discharge of fine particulates from the furnace with the exhausted products of combustion is reduced with a consequential benefit to the environment. The barrier may be positioned between the third and fourth ports of a furnace or between its fourth and fifth ports or even between its fifth and sixth ports as the furnace size, regenerator design, glass composition and fuel employed may dictate.

This invention is particularly applicable to the manufacture of flat glass wherein large amounts of molten glass are continuously prepared and formed into a continuous sheet or ribbon of flat glass. Flat glass, of course, is a term of art embracing flat, as well as curved or bent, glass made in sheet or plate form by any known forming process including sheet drawing processes, glass floating processes, rolling processes and the like. Typical glass compositions which may be efficiently produced according to this invention include soda-lime-silica glasses, borosilicate glasses, alumino silicate glasses, borate glasses and the like.

In a typical embodiment of this invention a glass is made from a glass batch comprising from 5 to 50 percent by weight cullet (recycled glass) and the remainder from 95 to 50 percent by weight raw batch materials including sand, soda ash, or caustic soda, limestone, dolomite, rouge or other colorants, coal and salt cake. When this invention is practiced, the unmelted batch floating on the pool of hot molten glass prevents the ready escape of sulfurous compounds from the melt during melting and reaction. Sulfur emissions from the furnace are reduced and, ancillary to that, the amount of flux, such as salt cake, in the batch can and must be reduced to maintain a desired blanket of unmelted batch over the molten glass. Therefore, not only are emissions reduced but also waste of flux materials is reduced as well.

Details of this invention may be further appreciated with reference to the appended drawings.

BRIEF DESCRIPTION OF THE DRAWINGS

FIG. 1 is a schematic sectional longitudinal elevation view of a glassmaking furnace having the features of this invention.

FIG. 2 is a partial plan view of the furnace of FIG. 1 taken along line 2—2 of FIG. 1; and FIG. 3 is a partial plan view of a furnace showing the same portion as shown in FIG. 2 and illustrating a preferred electrode arrangement.

DETAILED DESCRIPTION OF THE PREFERRED EMBODIMENTS

Referring to FIGS. 1 and 2, there is shown a regenerative glassmaking furnace having a melter 31 connected to a refiner 33 to which there is connected a molten glass delivery facility 34.

The furnace includes a melter bottom 35, a back basin wall 37 and melter side walls 39. The side walls 39 include conventional lower basin wall and upper breast wall portions (unnumbered). The furnace further includes an upper or suspended back wall 41 and a roof or crown 43. As described above, the furnace may be provided with a drop arch or barrier 44 extending transversely across the upper or headspace portion of the furnace at about the location where glass batch melting is to be completed. This barrier 44 may be located as shown or may be as far downstream as between the fifth and sixth ports (the burner of the fifth port is indicated by numeral 47 while the sixth port is indicated by numeral 47).

The furnace is an elongated one as seen in FIG. 1 and it has a plurality of firing ports 45 through its elongated side walls 39. These ports 45 are connected to regenerators (not shown) on either side of the furnace. Extending into each firing port 45 which is to be fired is a burner 47 through which gas, oil or other fuel may be directed for combustion at the tip of the burner 47. Preheated air enters the furnace headspace through the ports 45 around the burners 47. The air is preheated by passing through the regenerator on one side of the furnace in the conventional way as only the burners on that side are fired at a given time. The products of combustion are exhausted from the furnace through its ports and regenerator on the opposite side from that where firing is accomplished. Firing is periodically reversed from side to side in the usual way.

The furnace is generally provided with skim kilns 49 near the downstream end of the melter 31. The terms "upstream" and "downstream" refer to the general direction of glass flow through the furnace so that in FIG. 1 the left side is the upstream end and the right side is the downstream end of the furnace.

The firing ports 45 in the upstream end of the melter 31 are provided with dampers 50 to isolate the headspace at that end of the furnace from the regenerators.

The refiner 33 includes a refiner bottom 51, a front basin wall 53, an upper front wall 55, a roof or crown 57 and side walls 59. The melter 31 and refiner 33 are joined through a bridge wall 61 and waist or tapered wall sections 63. The refiner 33 may be provided with skim kilns 65. Joining the melter bottom 35 and refiner bottom 51 is a bottom section including steps 67 and planes 69. The heights of the steps and lengths of the planes are designed to aid in the establishment of desirable flows in a pool of glass 70 which resides in the lower portion of the furnace.

Coolers 71, 73 and 75 may be disposed across the furnace and submerged in the glass in the manner shown in U.S. Pat. No. 3,836,349 in order to regulate the flow of molten glass within the furnace.

The major molten glass flow streamlines are illustrated in FIG. 1. A "spring zone" 71 is established in the melter 31 at about the location of maximum glass temperature in the vicinity of the last fired port. The "spring zone" is a region of upward convective flow in the pool of molten glass. Downstream of the spring zone the convection flow of glass has a return flow stream along the bottom of the furnace as illustrated by streamlines 79, 81 and 83, while upstream of the spring zone there is a return flow 85. Moving away from the spring zone in a downstream direction is the major flow stream 87 including the throughput component of flow 89 which continues out of the furnace as it is delivered for forming. As will be seen below, these flows are important to the present process for they serve to distribute the heat introduced into the furnace to all the glass in the furnace.

Glass batch materials 90 are charged into the furnace over its back basin wall 37. After the batch materials 90 are pushed beneath the suspended back wall 41, they advance freely along the surface of the molten glass 70. Electrodes may be mounted in the furnace in several ways. Any or all of the illustrated groups of electrodes may be provided.

A pair of end-mounted electrodes 101 and 101' may extend into the furnace through the back wall 37. The electrodes are provided with connectors 103 and 103', respectively, which are connected to a source of electric power (not shown).

Bottom electrodes 105 and 105' may be provided in the central portion of the furnace. These are extended through the melter bottom 35 and provided with connectors 107 connected to a source of electric power (not shown). If desired, additional bottom electrodes 109 and 109' may be provided with these electrodes having connectors 111.

Side electrodes 113 and 113' may also be employed. These extend through the side walls 39 and are provided with connectors 115 and 115' which are connected to a source of electric power (not shown).

Alternating current is used in order to provide sufficient power density to heat the glass generally without developing sustained excessive resistance heating at the ends of the electrodes or at the remaining electrode-glass interfacial regions. Electrodes may be paired and connected to a single-phase source of power or grouped in groups of three and connected to a three-phase source of power.

In a particularly preferred embodiment of this invention, a row of bottom electrodes extends across the furnace between the suspended or upper back wall 41 and the third firing ports of the furnace. As shown in FIG. 3, this row of electrodes 105a through 105e and 105'a through 105'e extends across the furnace between the first and second ports. Groups of three electrodes are connected to a source of three-phase electric power with electrodes 105c, 105d and 105e being grouped together, for example.

In order to monitor the application of heat to the furnace, it is desirable to mount thermocouples 117 and 117' and thermocouples 119 and 119' in the bottom of the furnace.

When carrying out the present process in a furnace having an electrode arrangement as shown in FIG. 3, overall energy requirements should be reduced on the order of 15 to 20 percent compared to the energy required to melt and refine glass in the same size furnace using overhead firing alone. On a typical horizontal regenerative furnace having six ports on each side and melting glass at a rate of from 400 to 600 tons per day ($4.1 \times 10^3$ to $6.1 \times 10^3$ kilograms per day) by burning natural gas or oil at all ports, it is possible to energize a row of electrodes beneath the glass between the first and second ports, terminate firing through the first two ports and decrease firing through the third port and maintain the rate and quality of glass production. This may be done with electrical energy equivalent to only about half the energy of the flame (combustion) reduction in the furnace.

The heat from dissipation of the current from the electrodes is generated beneath freely advancing floating batch materials downstream of the fill doghouse (charging kiln) of the furnace. Downstream of the floating batch the overhead heat is applied to a freely advancing surface of the molten glass as the glass flow is maintained at the surface rather than being forced under a floater or through a submerged throat. Thus, the full advantages of a strong spring zone flow can be achieved. The molten glass is thoroughly homogenized by the internal shear of adjacent flowing streams within the pool of molten glass, yet the glass is caused to flow in a downstream direction from the spring zone with substantial uniformity of velocity and temperature. As a result, the glass is thoroughly homogenized, refined and made substantially free of ream, striae or cords.

Particulate emission is decreased as flames no long sweep over unmelted batch into the regenerators through the first two ports. Sulfate and other sulfurous emissions also decrease as the temperature of the exposed, unmelted, unreacted batch is kept significantly below its temperature when subjected to impinging flames. Because of this, the amount of salt cake added to the batch can be, and is, reduced.

With the unmelted batch insulating the crown and side walls from the underlying molten glass, the temperatures of the crown, side walls and regenerator packing decrease. As a consequence refractory wear, deterioration and slumping are reduced.

While this invention has been described with reference to particularly preferred embodiments for purposes of illustration, those skilled in the art will recognize that variations may be made without departing from the spirit or scope of this invention as claimed here.

We claim:

1. In a side-fired regenerative glassmaking furnace comprising an enclosed chamber for containing a pool of melted glass and providing a headspace above the molten glass; the chamber having a bottom, side walls, a front wall, a back wall and a roof; further having, in the vicinity of said back wall, means for charging glass batch materials into said furnace; further having, in the vicinity of said front wall, means for discharging molten glass from said furnace; and further having means for supplying heat to at least a portion of said furnace for melting glass batch materials forming molten glass therefrom; said heating means comprising at least five firing ports extending outwardly from each side of the furnace and connected to regenerators; wherein a portion of said furnace is for advancing glass batch materials floating on molten glass in a general direction away from said back wall and toward said front wall while melting said floating glass batch materials, the improvement comprising dampering means substantially blocking each of the first and second ports of the furnace providing a substantially enclosed headspace in the region of the first and second ports isolated from the regenerators of the furnace;

submerged electrode means for applying heat to molten glass contained in the furnace only in a region lying between the side walls of the furnace and extending along the length of the furnace from its back wall to a region between its third firing ports and within a bottom portion of the furnace beneath the surface of a pool of molten glass contained therein; and combustion means in firing ports in a downstream region extending between the third firing ports and the front wall and substantially open exhaust means through firing ports in said downstream region for exhausting substantially all exhausted gases from the furnace to the regenerators from said downstream region.

2. The apparatus according to claim 1 further comprising means for at least partially segregating the headspace of the furnace at a location between the dampered ports and the remaining ports.

3. The apparatus according to claim 2 wherein the segregating means comprised a transverse drop arch extending across the headspace of the furnace and extending downwardly from its roof into a closely spaced relation with a pool of molten glass in the furnace at a location between the third and sixth ports of said furnace.

* * * * *